United States Patent
Tringe et al.

(10) Patent No.: US 8,512,588 B2
(45) Date of Patent: Aug. 20, 2013

(54) METHOD OF FABRICATING A SCALABLE NANOPOROUS MEMBRANE FILTER

(75) Inventors: Joseph W. Tringe, Walnut Creek, CA (US); Rodney L. Balhorn, Livermore, CA (US); Saleem Zaidi, Albuquerque, NM (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 171 days.

(21) Appl. No.: 12/856,527

(22) Filed: Aug. 13, 2010

(65) Prior Publication Data

US 2012/0037591 A1 Feb. 16, 2012

(51) Int. Cl.
*B44C 1/22* (2006.01)

(52) U.S. Cl.
USPC ........ 216/99; 216/2; 216/17; 216/40; 216/94; 438/753

(58) Field of Classification Search
USPC ................. 216/13, 27, 83, 96, 99, 100, 2, 17, 216/39, 40, 41, 94; 438/745, 753, 733; 430/313, 314
See application file for complete search history.

(56) References Cited

U.S. PATENT DOCUMENTS

| | | | |
|---|---|---|---|
| 5,204,690 A * | 4/1993 | Lorenze et al. | 347/93 |
| 5,882,496 A | 3/1999 | Northrup et al. | |
| 6,762,057 B1 | 7/2004 | Gilton | |
| 6,849,768 B2 | 2/2005 | Harmer et al. | |
| 2003/0207326 A1 | 11/2003 | Su et al. | |
| 2005/0127035 A1 | 6/2005 | Ling | |
| 2006/0063351 A1 * | 3/2006 | Jain | 438/455 |
| 2006/0273065 A1 * | 12/2006 | Kim et al. | 216/2 |
| 2007/0032089 A1 * | 2/2007 | Nuzzo et al. | 438/725 |
| 2007/0278183 A1 * | 12/2007 | Lee et al. | 216/83 |

FOREIGN PATENT DOCUMENTS

| | | |
|---|---|---|
| WO | 2004/085609 A2 | 10/2004 |
| WO | 2004/097894 A2 | 11/2004 |

OTHER PUBLICATIONS

G. Ensell, "Alignment of Mask Patterns to Crystal Orientation", Sensors and Actuators A 53, Department of Electronics and Computer Science, pp. 354-348 (1996).
Kovacs, et al., "Bulk Micromachining of Silicon", Proceedings of the IEEE, vol. 86, No. 8, pp. 1536-1551, Aug. 1998.
Storm, et al.,"Fabrication of Solid-State Nanopores With Single-Nanometre Precision", Nature Materials, vol. 2, pp. 537-540 (Aug. 2003).

* cited by examiner

*Primary Examiner* — Lan Vinh
(74) *Attorney, Agent, or Firm* — James S. Tak

(57) ABSTRACT

A method of fabricating a nanoporous membrane filter having a uniform array of nanopores etch-formed in a thin film structure (e.g. (100)-oriented single crystal silicon) having a predetermined thickness, by (a) using interferometric lithography to create an etch pattern comprising a plurality array of unit patterns having a predetermined width/diameter, (b) using the etch pattern to etch frustum-shaped cavities or pits in the thin film structure such that the dimension of the frustum floors of the cavities are substantially equal to a desired pore size based on the predetermined thickness of the thin film structure and the predetermined width/diameter of the unit patterns, and (c) removing the frustum floors at a boundary plane of the thin film structure to expose, open, and thereby create the nanopores substantially having the desired pore size.

6 Claims, 11 Drawing Sheets

METHOD OF FABRICATING A SCALABLE NANOPOROUS MEMBRANE FILTER

I. FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

II. FIELD OF THE INVENTION

The present invention relates to molecular filters and sieves, and more particularly to a method of fabricating a nanoporous membrane filter having arrays of uniform nanopores each scalable from a few nanometers to hundreds of nanometers in diameter for use in filtering, separating, sorting or otherwise screening molecules and particles.

III. BACKGROUND OF THE INVENTION

For applications such as protein screening, organic and inorganic molecular development, and pre-screening of toxins and other molecules for sensor applications, there is a need for nanoporous filters and screens with uniform pore size, scalable between ~1-100 nm. For example, all protein production, isolation and purification efforts require that the proteins be: (a) separated away from other contaminating proteins and other molecules, (b) analyzed to assess its degree of homogeneity, and (c) treated to change the type of solution or buffer in which it is dissolved. The fact that each protein behaves differently in each of these steps can often make the task of working with isolated proteins difficult, particularly when the goal is to develop high throughput methods for their production and purification. Differences in homogeneity following purification can be caused by variation in post-translational modifications, dissociation of subunits, differences in the degree of folding, and proteolytic degradation.

A variety of methods have been developed for determining the size of a protein or protein complex, assessing the heterogeneity of the population, or separating proteins from other molecules. For example, conventional methods for assessing the size of protein complexes have included size exclusion chromatography (SEC) or electrophoresis in native gels, dynamic light scattering, electron microscopy, scanning probe microscopy, sedimentation rates, mass spectrometry, nuclear magnetic resonance (NMR) spectroscopy, neutron scattering, and small angle X-ray scattering (SAXS). In addition to providing an estimate of size, several of these methods (SEC, sedimentation, dynamic light scattering) have been used to directly or indirectly facilitate protein separation and purification. The development of many of these standard methods for high-throughput applications in microfabricated systems, however, has remained difficult. Most methods currently used in high-throughput, chip-based systems involve electrophoretic separations of the components. Many of these techniques also require costly instrumentation and are labor intensive.

And some common methods for characterizing the homogeneity of a bio-molecule such as a protein or toxin are those that separate the components based on physical size (e.g. size exclusion chromatography, mass spectrometry) or a combination of size and charge density (e.g. gel electrophoresis). While all three techniques can be adapted for high throughput applications and incorporated into automated systems, each has limitations. For example, size exclusion chromatography using gel matrices dilutes the sample and has limited resolving power to provide accurate details about size heterogeneity. Mass spectrometry can provide the most accurate assessment of sample homogeneity, but variations in ionization efficiency can make it difficult to accurately quantify the relative proportion of the components. And electrophoretic methods can resolve molecules that differ by as little as a single positive or negative charge, but apparently homogeneous samples can often contain multiple components that have the same charge density per unit mass.

Advances in the development of silicon and other materials with nanometer-scale (1-1000 nm) pores or slits have raised the possibility of producing molecule sizing filters with a sufficiently large dynamic range of size selection (extending from ~1 nm to 1 µm) to cover, for example, the entire range of known sizes of proteins and protein complexes. However, the use of standard lithographic processes for producing the smallest of these features sizes (i.e. in the range of ~1-100 nm) has been difficult for large areas (i.e. greater than 1 $cm^2$, and typically in the range of tens of $cm^2$) required for most molecular filter applications. And while non-lithographic methods have been developed for producing near-nanometer pore sizes, their usefulness is limited due to lack of pore size uniformity and repeatability. For example, porous membranes created through anodic etching and mesoporous silica formed through sol-gel process have non-uniform pore diameters, respectively, which typically vary over a broad range: ~30-400 nm for anodic alumina and ~2-20 nm in sol-gel films. These limitations are difficult to address due to critical dependence of process chemistry on several variables such as solution concentration, temperature, and current. Other filter materials such as zeolites have uniform pores, but only in the relatively narrow range of ~0.3-3 nm. Carbon nanotubes are being developed at the Lawrence Livermore National Laboratory for filters in the 1-10 nm range, but scaling beyond this limit is extremely challenging, and the cylindrical shape of the pores may present additional complications. Finally, ion-track etching through polycarbonate films can produce a wide range (~10 nm to ~µm) of pore diameters, but pore uniformity and flow rates have been observed to be limited to about ±20% and <0.1 mL/min/$cm^2$, respectively, for 10 nm diameter pores.

Thus there is a need for a method of fabricating large-area nanoporous filters and screens having uniform pores with scalable pore diameters ranging from a few nanometers to hundreds of nanometers, and capable of efficiently separating and characterizing molecules and small particles.

IV. SUMMARY OF THE INVENTION

One aspect of the present invention includes a method of fabricating a nanoporous membrane filter having an array of uniform nanopores of a desired pore size, comprising: providing a thin-film multilayer having a (100)-oriented single crystal silicon layer adjacent a substrate layer, said single crystal silicon layer of a predetermined thickness which etches anisotropically with an anisotropic wet chemical etchant selective to silicon over a material of the substrate layer; forming a hard mask layer over the single crystal silicon layer; depositing photoresist over the hard mask layer; using at least two interferometrically-arranged lasers to define in the photoresist an etch pattern comprising an array of unit patterns each having a predetermined width that is substantially a function of the desired pore size and the predetermined thickness of the single crystal silicon layer; transferring the etch pattern from the photoresist to the hard mask layer to expose select portions of an upper boundary surface of the single crystal silicon layer; anisotropically etching the exposed select portions of the upper boundary surface of the single crystal silicon layer with the anisotropic wet chemical etchant until a lower boundary plane of the single crystal silicon layer is reached so that an array of inverted frusto-pyramidal etch cavities are formed each having a frustum floor at the lower boundary plane that is substantially equal in width to the desired pore size; and etching a section of the substrate layer with an etchant that is selective to the substrate material over silicon to remove the frustum floor of the etch pits at the lower boundary of the single crystal silicon layer and thereby form the array of uniform nanopores of substantially the desired pore size.

Another aspect of the present invention includes a method of fabricating a nanoporous membrane filter having an array of uniform nanopores of a desired pore size, comprising: providing a thin-film multilayer having a substrate and a thin film layer of predetermined thickness which etches isotropically when etched with an isotropic wet chemical etchant that is selective to the thin film layer; depositing photoresist over the thin film layer; using at least two interferometrically-arranged lasers to define in the photoresist an etch pattern comprising an array of unit patterns each having a predetermined width that is substantially a function of the desired pore size and the predetermined thickness of the thin film layer, wherein the etch pattern exposes select portions of the thin film layer; etching the exposed select portions of the thin film layer with the isotropic wet chemical etchant including controlling etch time so that an array of frusto-spherical etch pits are formed each having a frustum floor at a lower boundary of the thin film layer that is substantially equal in diameter to the desired pore size; and etching a section of the substrate with an etchant selective to the substrate to remove the circular frustum floor of the etch pits at the lower boundary of the thin film layer and thereby form the array of uniform nanopores having the desired pore size.

Another aspect of the present invention includes a method of fabricating a nanoporous membrane filter having an array of uniform nanopores of a desired pore size, comprising: depositing photoresist on an uppermost layer of a thin-film multilayer comprising a substrate and a thin film layer over the substrate, said thin film layer having a predetermined thickness and which etches with a wet chemical etchant that is selective to the thin film layer; using interferometric laser exposure to define on the photoresist an etch pattern comprising an array of unit etch patterns; etching the thin film layer with the wet chemical etchant so that an array of frusto-geometric etch pits are formed each having a frustum floor at a lower boundary of the thin film layer that is substantially equal in size to the desired pore size; and etching a section of the substrate with an etchant selective to the substrate to remove the frustum floor of the etch pits at the lower boundary of the thin film layer and thereby form the array of uniform nanopores having the desired pore size.

Generally, the present invention is directed to a method of fabricating nanoporous membrane filters having uniformly sized and patterned 2D arrays of nanopores etched in a suitably rigid thin film layer of a type having a known etch profile when etched with a known compatible etchant (e.g. anisotropic etching profile of silicon using KOH). Example materials for the thin film layer include, for example, thin single crystal silicon or alternatively silicon dioxide or silicon nitride. In any case, each pore of the arrays of nanopores is scalable from about 1-100 nm diameter over a large area of about 1 cm$^2$ or greater. The present invention also directed to the nanoporous membrane filters and molecular sieves fabricated according to this method, for use in filtering, sorting, and otherwise screening molecules and particle.

In particular, the fabrication method of the present invention involves creating uniform nanopores in a thin film structure (e.g. (100)-oriented single crystal silicon) which are produced by (a) creating an etch pattern comprising a plurality array of unit patterns using interferometric lithography, (b) using the etch pattern to etch frustum-shaped cavities or pits in the thin film structure (which has a predetermined thickness) so as to control the dimension of the frustum floor of each cavity to be substantially equal to a desired pore size, and (c) removing the frustum floors at a boundary plane of the frustum-shaped cavities to expose, open, and thereby create the pores.

The membrane material in which the nanopore arrays are etched may be selected from various types of materials having a known etch profile for any number of etchants. Three example materials are discussed herein, including (100)-oriented single crystal silicon, $SiO_2$, and $Si_3N_4$. In any case, the membrane material is provided as part of a thin-film multilayer which also includes a buffer layer adjacent to and bounding the membrane material layer. Generally, the buffer layer may comprise any material that etches at a slower rate than the membrane material when etched with an etchant selective to the membrane material. For example, a nitride or oxide such as silicon nitride or silicon dioxide may be used as the buffer layer material when (100)-oriented silicon is etched with a wet chemical etchant selective to silicon over the silicon nitride or silicon dioxide, such as KOH. Also, while KOH is used herein as a common example for anisotropically etching silicon, it is appreciated that other alternative etchants may be employed (e.g. tetramethylammonium hydroxide or "TMAH") so long as they also have similar etch characteristics, such as selective etching and anisotropically or isotropically etching a particular type of material.

It is notable that a frustum is the portion of a solid (such as for example a cone, pyramid, or sphere) which lines between two parallel planes cutting it. As such, "frusto-pyramidal" means having the shape of a frustum of a pyramid, "inverted frusto-pyramidal" means having the shape of a frustum of an inverted pyramid, and "frusto-spherical" means having the shape of a frustum of a sphere. Also, "frusto-geometric shape" means having the shape of a frustum of a generic three-dimensional geometric structure. It is also appreciated that "nanopore" is a nanoscale pore, "nanoporous membrane" is a membrane with nanoscale pores, and a "nanoporous membrane filter" is a filter having a nanoporous membrane construction.

In a first exemplary embodiment, a nanoporous membrane filter is fabricated by anisotropically etching a nanopore array in a (100)-oriented single crystal silicon material. The silicon material is provided as a layer of a multilayer substrate comprising the silicon layer bounded by a silicon dioxide layer. A preferred example of such a multilayer substrate is a silicon-on-insulator ("SOI") wafer. A silicon nitride or silicon dioxide layer is formed as a hard mask on the silicon layer, and having an etch pattern that is itself patterned from the photoresist etch pattern produced by interferometric lithography. Using the etch pattern of the hard mask as a template, the single crystal silicon material is anisotropically etched using a wet etchant that selectively etches silicon to $SiO_2$, such as KOH. Since the anisotropic etching of the (100)-oriented silicon material is known to produce (111)-oriented etch pit sidewalls angled at 54.47 degrees, the dimensions (i.e. width) of each unit pattern of the mask pattern and the thickness of the silicon layer are selected and predetermined so as to produce a frustum floor at a boundary plane between the silicon layer and the silicon nitride/silicon dioxide layer having the desired dimension (width or diameter). By selectively etching the silicon nitride/silicon dioxide layer to silicon, the frustum floor is removed and the pore is exposed and opened.

In a second exemplary embodiment, a nanoporous membrane filter is fabricated by isotropically etching a nanopore array in thin film layer which is known to etch isotropically when etched with a wet chemical etchant that is selective to the thin film layer. Example materials for the thin film layer may include silicon nitride or silicon dioxide. In this case, the silicon nitride or silicon dioxide material is provided as a layer of a multilayer substrate comprising the silicon nitride or silicon dioxide layer bounded by a silicon wafer layer. A photoresist pattern produced by interferometric lithography on the silicon nitride or silicon dioxide layer also functions as the mask pattern for etching. Using the etch mask as a template, the silicon nitride or silicon dioxide material is isotropically etched that selectively etches $SiO_2$ or $Si3N4$ to Si. Because the isotropic etch forms a rounded, substantially spherical cavity in the silicon nitride or silicon dioxide layer, it is appreciated that a bottom of the cavity tapers to a central nadir. By controlling etch time, a frustum floor of the rounded etch cavity may be formed at a boundary plane between the silicon layer and the silicon nitride/silicon dioxide layer having a desired dimension (width or diameter). By selectively etching the silicon to silicon nitride/silicon dioxide, the frustum floor is removed and the pore is exposed and opened.

Because the method of fabrication of the present invention is based on highly-developed lithographic processing methods used for semiconductor fabrication, it provides a key advantage in terms of its compatibility with large areas and simple processing tools, which can lead directly to low manufacturing costs. It also enables certain advantages over non-lithographic techniques. For example, pattern uniformity of the 2D nanopore arrays of the present invention is determined by the wavelength of the laser exposure source, which is an absolute constant. And pore uniformity is determined by etching anisotropy of <111> silicon planes relative to the <100> silicon, which is highly predictable. And pore size itself is determined by processes parameters including the silicon film thickness, pattern periodicity, and oxidation, all of which are controllable to better than 1%. For example, nanometer-sized pores having average pore diameter of about 270 nm have been fabricated, with the standard deviation of the pore area less than about 15% of the average area. Moreover, performance advantages of the nanoporous membrane filters themselves include speed and efficiency of molecular mass transport, as well as reduced interference for transport by blocked pores.

The present invention is provided to solve the problem of purifying and characterizing bio-molecules. These arrays can enable a new class of robust, high-throughput, electronically-controlled filters for bio-molecule separation and synthesis, and for pre-screening of molecules in advanced sensors. Filter may be used in synthesizing and characterizing proteins. With the uniform pore arrays, basic questions concerning the structure of proteins and toxins, and their interactions with other molecules, can be addressed with unprecedented efficiency to enable powerful sensors and advanced tools for proteomics.

The filter can be useful as a critical pre-concentration and rapid characterization component of chem/bio-sensors. For example, the filter can be useful as a critical component of an advanced arsenic sensor, and in pre-screening of non-target materials for bio-sensors under development at LLNL. Generally, this filter would greatly improve a range of chem/bio sensor platforms, enabling a new class of rapid, electronically-controlled systems with very low alarm rates to be developed. Enables a high-throughput protein characterization capability that can be used to rapidly assess the size homogeneity and folded state of an expressed or synthesized protein or protein complex. Finally, the filter could be an important part of sensitive detectors for water contaminants, such as arsenic.

V. BRIEF DESCRIPTION OF THE DRAWINGS

The accompanying drawings, which are incorporated into and form a part of the disclosure, are as follows.

VI. DETAILED DESCRIPTION

Turning now to the drawings, FIGS. 1-13 show a first exemplary embodiment of the method of fabricating a nanoporous membrane filter of the present invention. In this first embodiment, an array of uniform nanopores is etch-formed in a suitably rigid thin-film layer of (100)-oriented single crystal silicon which forms the main body of the nanoporous membrane filter. As such, this thin-film layer may also be characterized as the "membrane layer," "membrane body," or "membrane structure."

Figure 1:
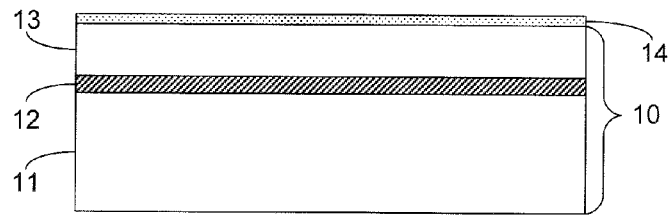
FIG. 1 is a schematic side view of a thin-film multilayer with a silicon nitride (or silicon dioxide) layer formed on a (100)-oriented single crystal silicon layer of the thin-film multilayer, in a first exemplary embodiment of the method of fabricating a nanoporous membrane filter of the present invention.

Generally, the (100)-oriented single crystal silicon is provided as a top layer of a thin-film multilayer which also includes one or more underlying substrate layers. In FIG. 1, the thin-film multilayer is particularly shown as a silicon-on-insulator ("SOI") wafer, generally indicated at 10. The SOI wafer 10 includes a (100)-oriented single crystal silicon top layer 13 and a silicon base layer 11 (e.g. a silicon wafer substrate for handling the SOI) as the two outer layers, and a buffer layer 12 between the two outer layers. It is notable that the buffer layer 12 is adjacent to and bounds the (100)-oriented single crystal silicon top layer 13, such that a lower boundary plane of the top layer is located between the top layer and the buffer layer. It is also notable that with respect to the top layer, both the buffer layer 12 and the silicon base layer 11 may be characterized together as the substrate, and individually as substrate layers. The single crystal silicon top layer 13 of the SOI wafer is typically thin and on the order of tens of nm to tens of microns thick, while the silicon base layer 11 ("handle") is typically hundreds of microns thick. The buffer layer 12 may be any suitable material having a slower etch rate than silicon when an etchant specific to silicon is used. For example, because the top layer is (100)-oriented single crystal silicon, silicon nitride or silicon dioxide may be used for the buffer layer 12.

An important parameter of the single crystal silicon layer is thickness because it is one of several key variables used in the present invention to control a desired pore size of the nanoporous membrane filter. In particular, it is important that this layer have a highly uniform thickness over large areas in order to create pores of a uniform size. In this regard, SOI wafers are useful because large-area SOI wafers of excellent quality and thickness uniformity are readily available from a number of sources. For example, the standard deviation in thickness of a common commercially-available 70-nm thick silicon-on-insulator layer is less than the thickness of a single atomic layer over 1 cm$^2$. And (100)-oriented 300 mm diameter silicon wafers are also commercially available where the top silicon layer is between 0.34 μm to 0.6 μm and the silicon thickness standard deviation is 1.7 nm over the entire wafer area.

Figure 2:
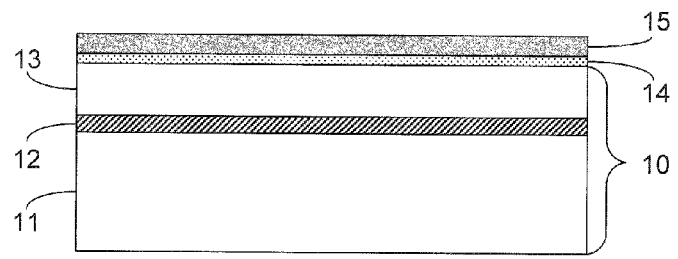
FIG. 2 is a schematic side view of the thin-film multilayer of FIG. 1 additionally having a photoresist layer deposited on the silicon nitride (or silicon dioxide) layer 1.

FIG. 1 also shows the deposition of a hard mask layer 14 on the single crystal silicon top layer 13. Example materials for the hard mask layer include silicon nitride or silicon dioxide. Following the hard mask deposition, photoresist 15 is next formed over the hard mask 14 as shown in FIG. 2. The uniformity of the photoresist thickness can be made to be very high even over the surface of a wafer 10 cm in diameter or larger.

Figure 3:
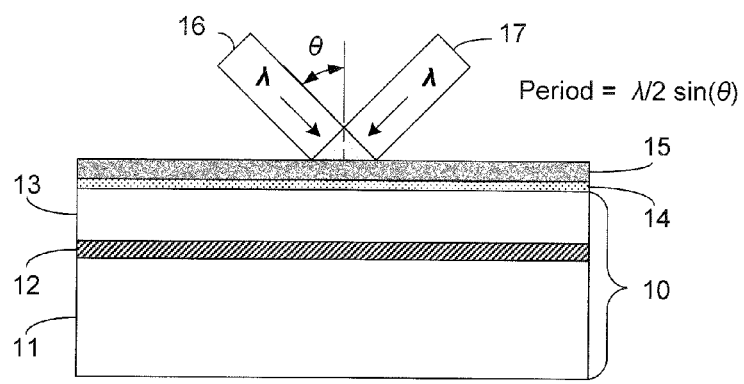
FIG. 3 is a schematic side view of the thin-film multilayer of FIG. 2 being exposed to interferometrically-arranged lasers to define an etch pattern on the photoresist.
Figure 4:
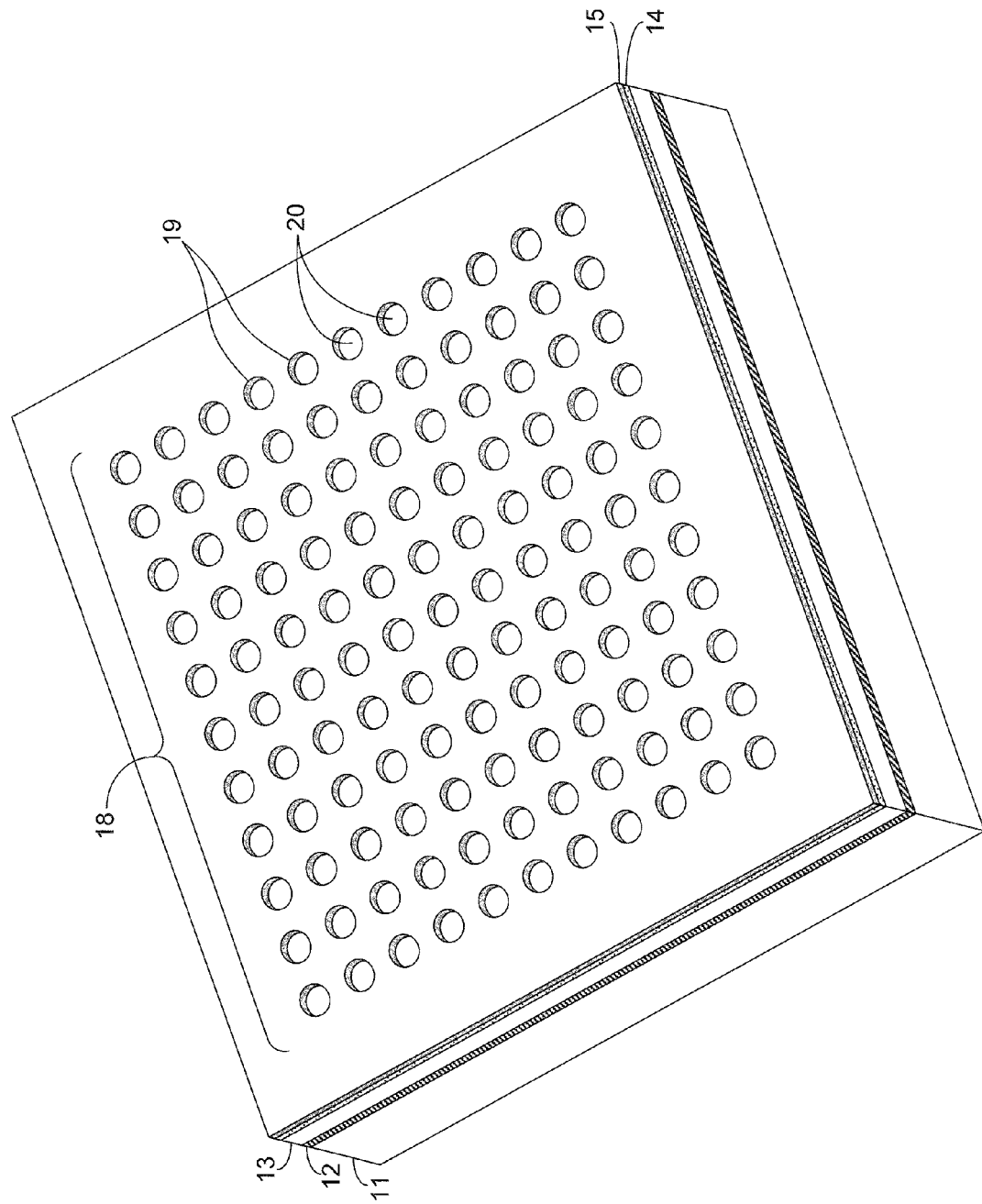
FIG. 4 is a perspective view of the nanoporous membrane filter following the interferometric laser exposure of FIG. 3 and showing the etch pattern created as a plurality array (11×11) of unit patterns in the photoresist.

Next, FIGS. 3 and 4 show the use of interferometric lithography to define etch patterns having a predetermined width or diameter. As shown in FIG. 3, two or more continuous wave coherent laser beams (e.g. 16, 17) are simultaneously incident on a surface coated with a thin film of photoresist 15, such that the intensity at the surface is modulated by the interference pattern. It is notable that pattern uniformity of the 2D arrays is determined by the wavelength of the laser exposure source, which is an absolute constant. FIG. 4 is a perspective view of the nanoporous membrane filter showing an exemplary etch pattern produced and developed as a plurality array 18 of unit patterns 19 on the photoresist layer 15. As shown in FIG. 4, each unit pattern reveals a portion 20 of an upper boundary surface of the underlying hard mask layer 14. It is appreciated that interferometric lithography makes use of domains of constructive interference between two coherent waves resulting in a 1-D periodic pattern defined by $\lambda/2 \sin \theta$, where $\lambda$ is the laser wavelength and $2\theta$ is the angle between two beams. By adding multiple exposure processes, arbitrary patterning is possible although still within a repetitive unit cell. By combining with nonlinear spatial period division techniques, patterning resolution beyond the theoretical $\lambda/2$ limit has also been demonstrated. Interferometric lithography techniques may be used in creating openings of ~150-nm width range at a period of 1.3 and 0.7 μm, and trench widths smaller than the period by as much as factors of 10 are also achievable. For example, parallel lines with widths as small as 135 nm can be easily created by applying two 257-nm laser beams incident at 80 degrees angular separation on a planar substrate. In tests performed at Lawrence Livermore National Laboratory, the uniformity of the photoresist patterns produced by interferometric lithography was shown to be superior than for PCTE. In particular, the standard error (average divided by standard deviation) of the pattern diameters was 0.76 for PCTE vs. 0.15 for interferometric lithography.

Figure 5:
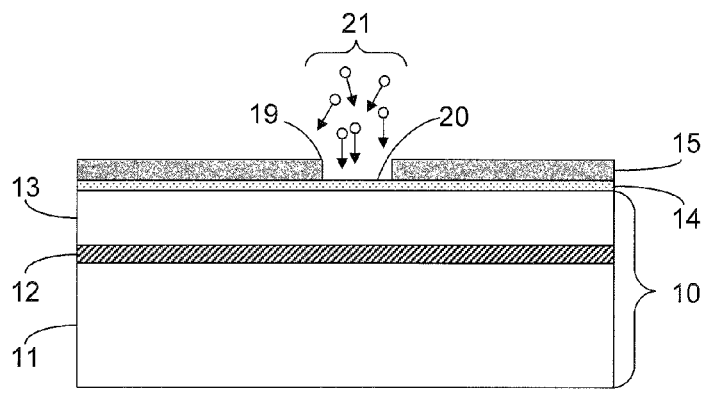
FIG. 5 is a schematic side view of the thin-film multilayer of FIG. 4 being plasma etched to transfer the etch pattern to the silicon nitride (or silicon dioxide) layer to be used as a hard mask layer. For clarity, only a single representative unit pattern is shown here.
Figure 8:
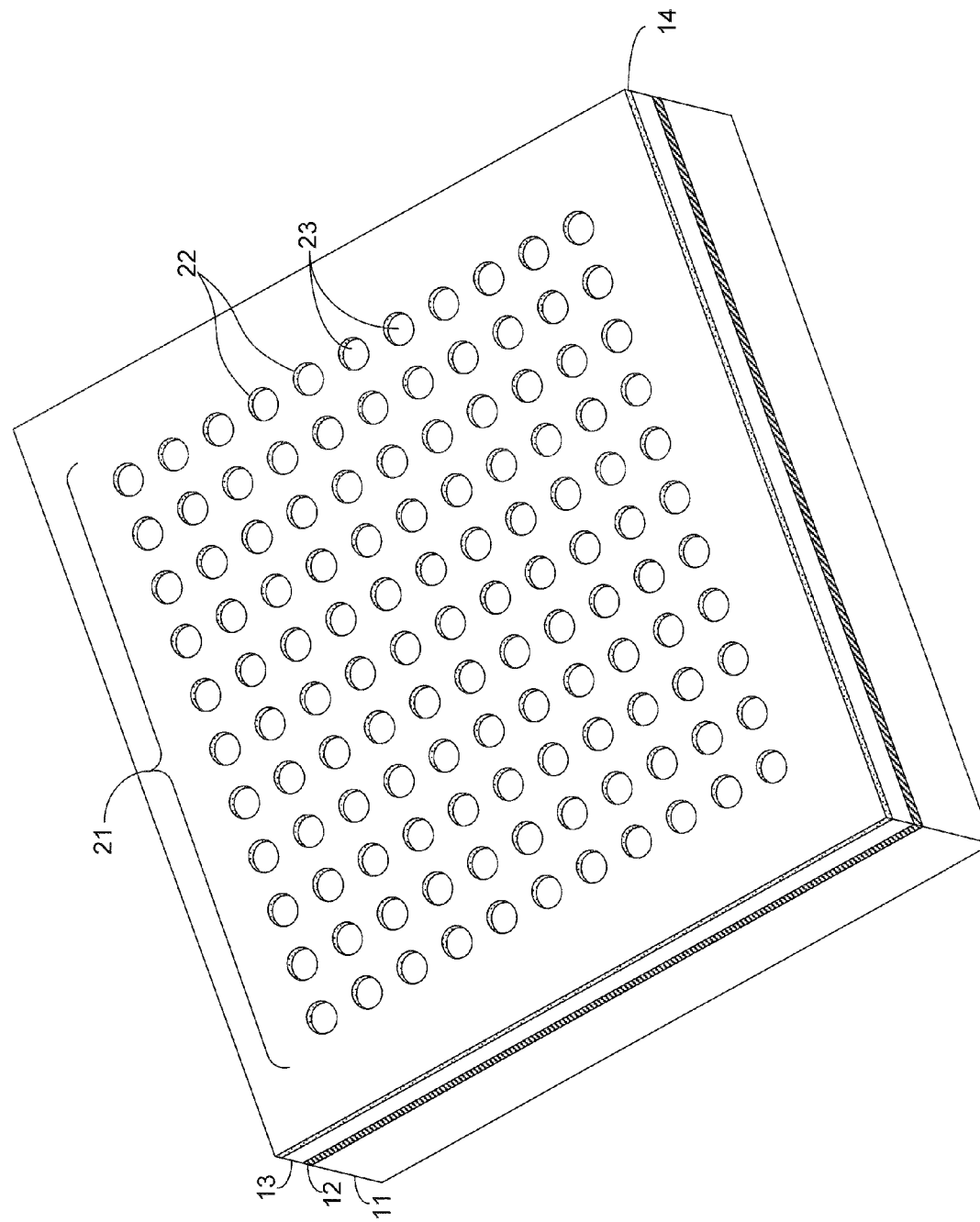
FIG. 8 is a perspective view of the nanoporous membrane filter following the plasma etch of FIG. 5 and showing the etch pattern comprising a plurality array of unit patterns in the hard mask layer of the silicon nitride or silicon dioxide.

In FIG. 5 the thin-film multilayer is next shown being plasma etched 21 to transfer the etch pattern, as represented by unit pattern 19, to the hard mask layer 14. The patterned hard mask layer 14 is shown in FIG. 8 showing a plurality array 21 of unit patterns 22, with each unit pattern exposing select portions 23 of an upper boundary surface of the single crystal silicon top layer 13. The patterned hard mask layer 14 of FIG. 8 is now ready for etching the single crystal silicon top layer.

Figure 6:
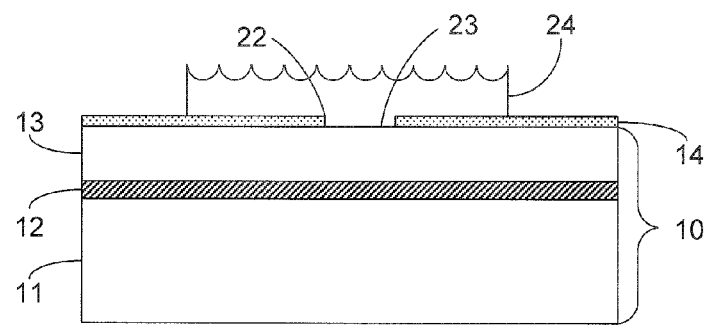
FIG. 6 is a schematic side view of the thin-film multilayer with the etch pattern produced from FIG. 5 and further illustrating an anisotropic etching step using a wet chemical etchant such as KOH that anisotropically etches silicon. Similar to FIG. 5, a single representative unit pattern is shown here for clarity.
Figure 7:
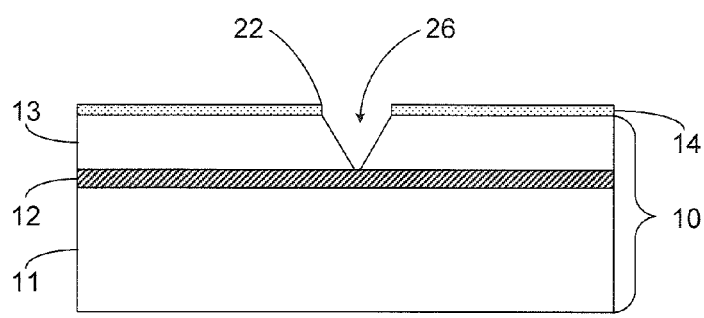
FIG. 7 is a schematic side view of the formation of an array of inverse frusto-pyramidal etch pits (a single representative etch pit shown) produced by the KOH anisotropic wet etching step of FIG. 6.
Figure 9:
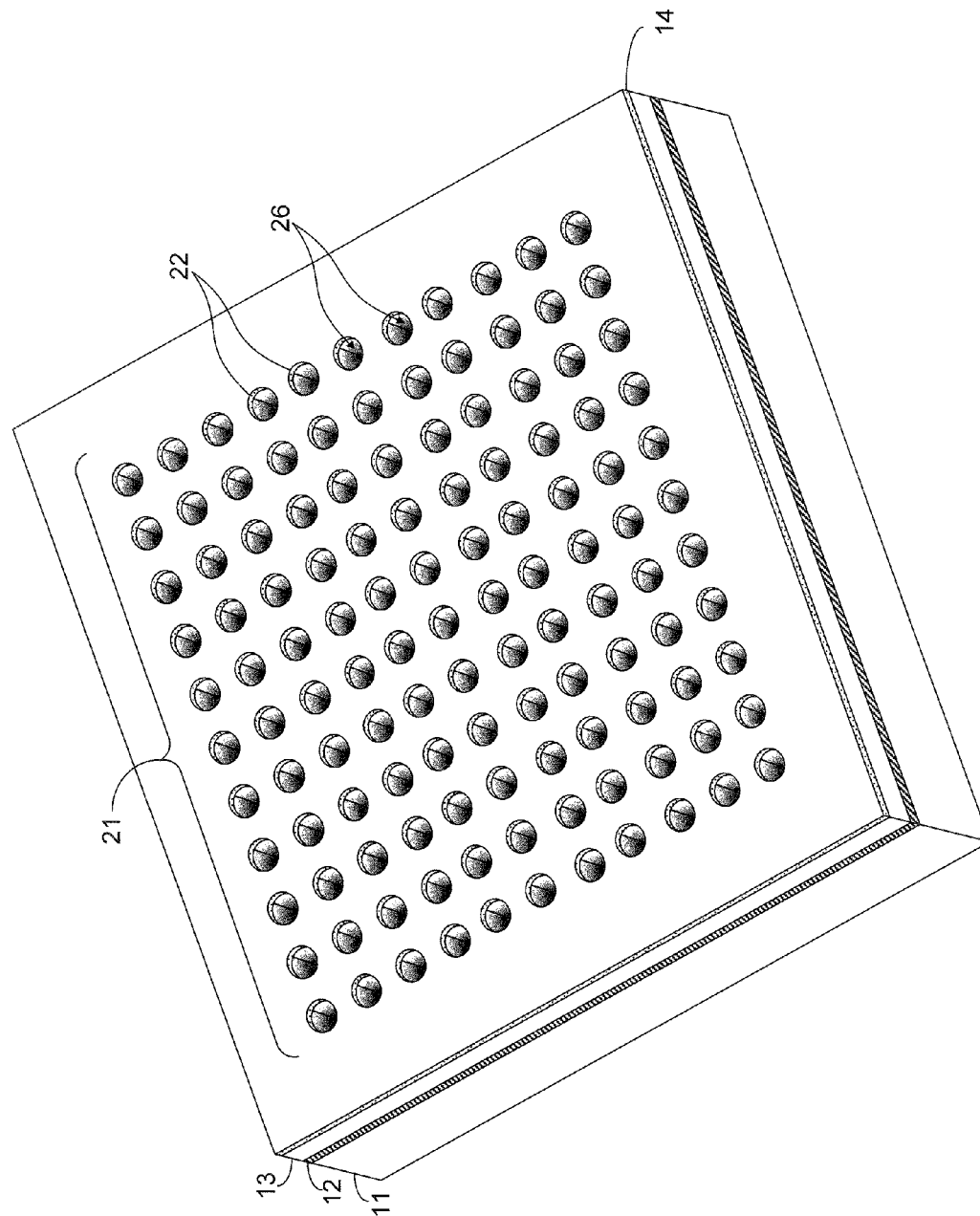
FIG. 9 is a perspective view of the nanoporous membrane filter of FIG. 7 showing the array of inverse frusto-pyramidal etch pits as seen through the etch pattern of the silicon nitride or silicon dioxide hard mask layer.
Figure 10:
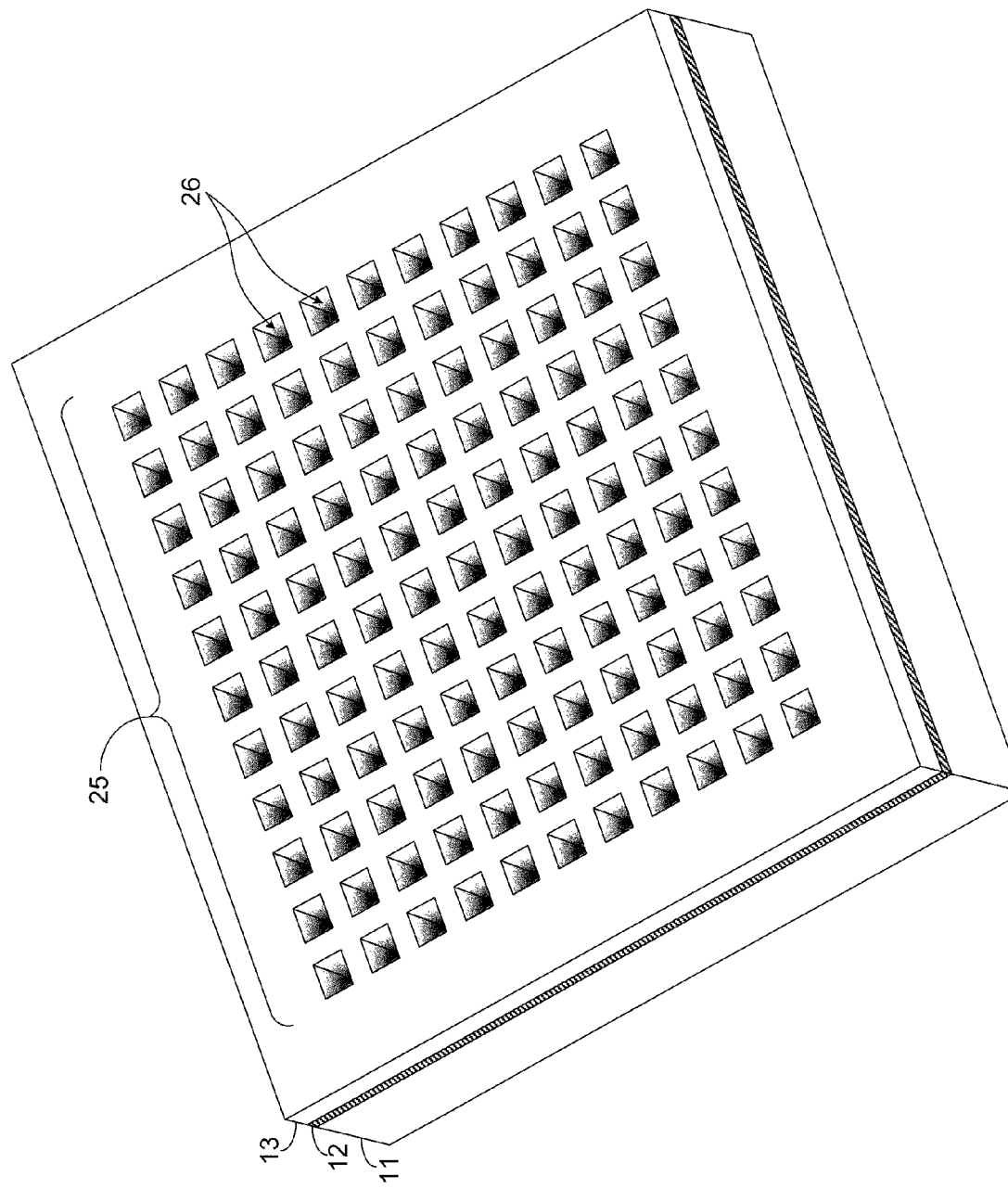
FIG. 10 is a perspective view of the nanoporous membrane filter of FIG. 9 after removing the silicon nitride or silicon dioxide hard mask layer (optional) to provide an unobstructed view of the array of inverse frusto-pyramidal etch pits.

Using the patterned hard mask 14 as a template, FIG. 6 shows the single crystal silicon top layer 13 being anisotropically etched using a wet etchant 24 that selectively etches silicon over $SiO_2$, such as for example KOH. In particular, KOH preferentially etches the (111) planes of silicon. And FIGS. 7, 9 and 10 show the formation of a plurality array 21 of inverse frusto-pyramidal etch pits 26 produced by the KOH anisotropic wet etching step of FIG. 6. In particular, FIG. 9 shows the array of inverse frusto-pyramidal etch pits 26 as seen through the patterned hard mask layer 14 and the array 21 of unit patterns 22, while FIG. 10 shows the array 25 of etch pits 26 with the hard mask layer removed (which is not necessarily required in the present fabrication method). In this way, inverted frusto-pyramidal cavities are formed in the single crystal silicon, and the intersection of the apex of these pyramids with the underlying silicon dioxide layer of the silicon-on-insulator structure defines the size of the pores. The anisotropic etch can create near-geometrically perfect structures. To achieve size uniformity among the pores created at the bottom of the inverse frusto-pyramidal cavities, the main technological requirement is that the dimensions of the mask be defined reproducibly in silicon. In other words, pore size uniformity is dependent on the dimensional uniformity amongst the unit patterns produced by interferometric lithography and the thickness uniformity of the single crystal silicon top layer.

Figure 11:
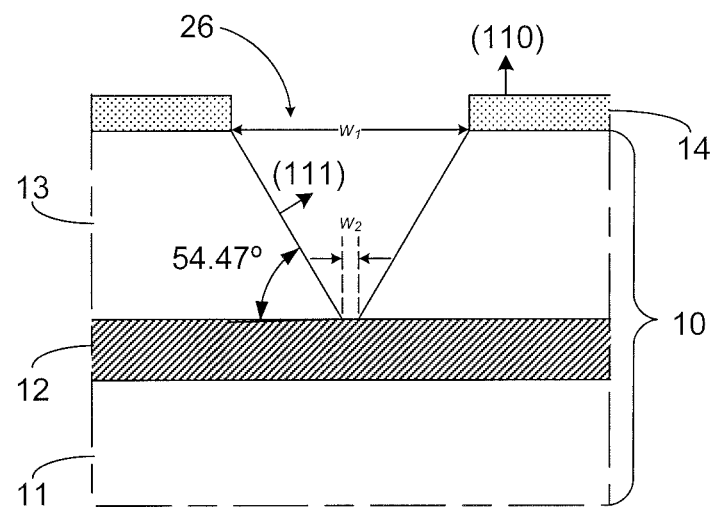
FIG. 11 is an enlarged view of the single representative inverse frusto-pyramidal etch pit shown in FIG. 7.

And FIG. 11 is an enlarged view showing details of the inverse frusto-pyramidal etch cavity/pit 26 shown in FIG. 7 formed by the anisotropic etching step. Etching of single crystal silicon in orientation-dependent alkaline solutions (e.g. KOH) is very well characterized. The etch anisotropy of the alkaline solutions results from the fact that there are fewer surface Si—OH bonds per unit cell on (111) compared to (100) and (110) surfaces, leading to higher energy to break the back bonds of the (111) surface silicon atoms. This anisotropic effect is employed to generate V-grooves in (100) silicon wafers using openings in an appropriate mask such as an oxide layer. The (111) planes form an angle of 54.74° with the (100) plane. Each inverse frusto-pyramidal etch cavity shown in FIG. 10 has four (111) plane surfaces each forming an angle of 54.47 degrees with the (100) plane and a frustum floor at a lower boundary plane of the single crystal silicon layer that is substantially equal in width to the desired pore size. Since the anisotropic etching of the (100)-oriented silicon material is known to produce four (111)-oriented etch pit sidewalls angled at 54.47 degrees, the dimensions (i.e. width, $w_1$, in FIG. 11) of each unit pattern of the etch pattern and the thickness of the silicon layer are selected and predetermined so as to produce a frustum floor at a boundary plane between the single crystal silicon layer 13 and the silicon nitride/silicon dioxide layer 12 having the desired pore size dimension (i.e. $w_2$ in FIG. 11). The fabrication of nanopores is sufficiently deterministic, and may be approximated by the following mathematical formula:

$$\text{pore width, } w_2 = \text{pattern width, } w_1 - \left(\frac{2}{\tan\theta}\right)\text{Si thickness, } d$$

where $w_1$ is the lithographically defined etch pattern width; d is the silicon thickness, and $w_2$ is the pore width/diameter. And θ is the angle of the (111)-oriented cavity walls, which is 54.47 degrees. Other factors not included in the above approximation is the total etch time, as well as the etch rate in the (111) plane which is relatively slow compared to etching in the (100) and (110) planes but is not non-existent. This causes some amount of undercutting below the patterned hard mask, which can produce a non-negligible effect on the pattern width value, $w_1$. For the case where $w_2=0$ (appropriate for a nanometer-scale pore), $d=w_1/1.414$. Therefore, for $w_1=1$ μm, the silicon film thickness must be ~0.7 μm to achieve a perfect V-groove ($w_2=0$) in 1D, or pyramidal structure, in 2D. This example shows that nanometer-scale trenches/holes can be achieved with a silicon film 0.7 μm thick, with micrometer-scale lithography.

Figure 12:
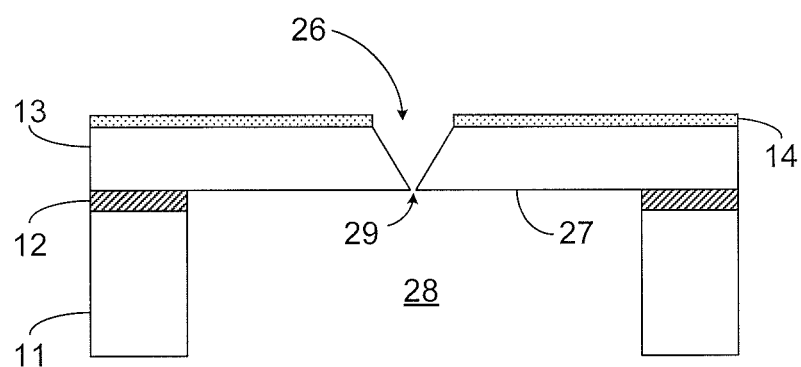
FIG. 12 is a schematic side view of the nanoporous membrane filter following FIG. 7 and showing the nanopores created at the bottom of the inverse frusto-pyramidal etch pits by removing a portion of the silicon handle wafer by selectively etching silicon over $SiO_2$, and subsequently selectively etching the $SiO_2$ over silicon.
Figure 13:
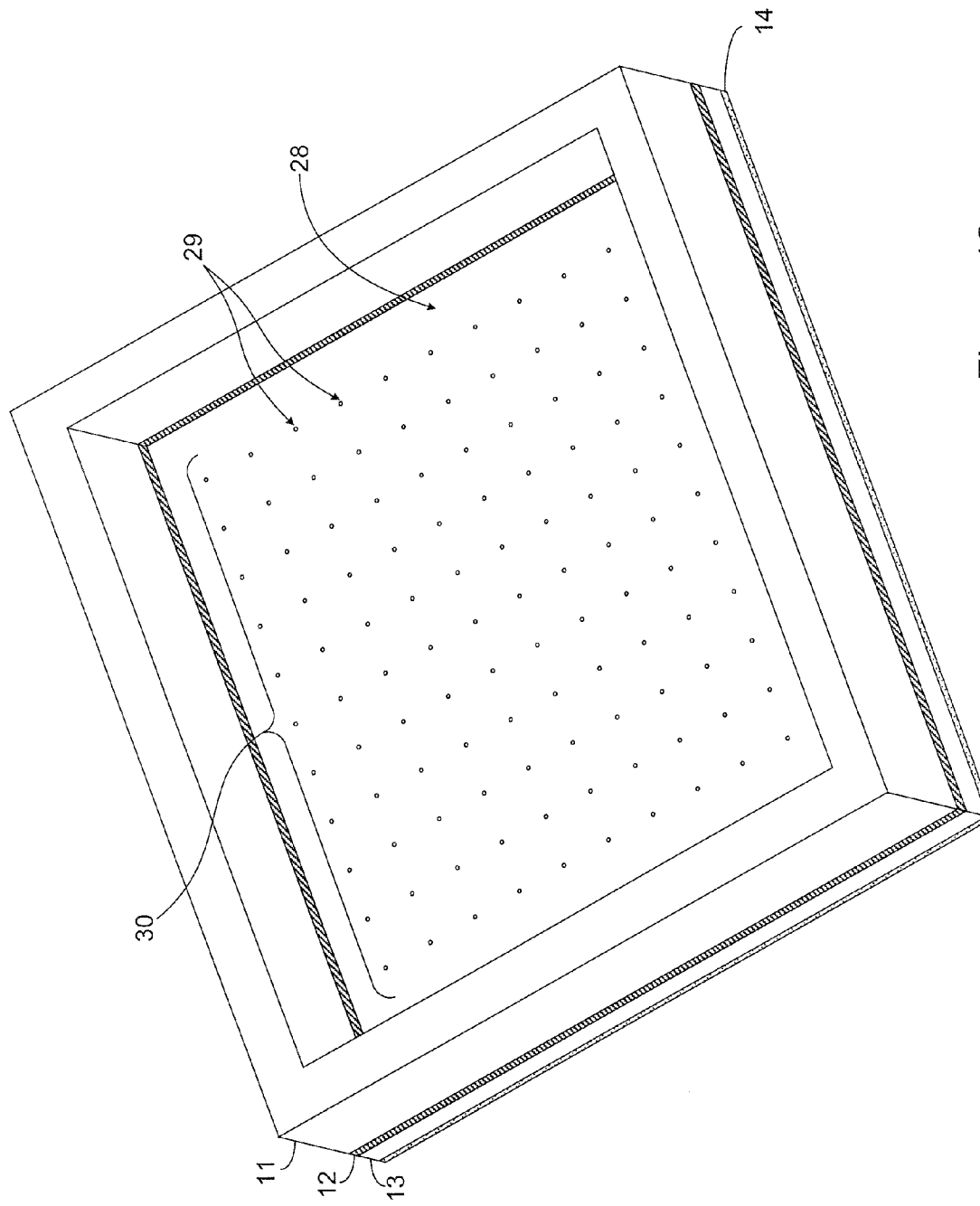
FIG. 13 is an underside perspective view of the nanoporous membrane filter of FIG. 12 showing the exposed and opened nanopore array.

FIGS. 12 and 13 show the final step of filter fabrication, where a section of the handle wafer 11 and buffer layer 12 are selectively etched away. Consequently, the frustum floors at the bottom of the etch cavities are thus removed to expose, open and thereby create the nanopore "windows" through the membrane structure so that fluids can pass through the pore and the inverted frusto-pyramid cavity. FIG. 12 is a schematic side view of the nanoporous membrane filter after removing a portion of the handle wafer by selectively etching silicon to $SiO_2$, and subsequently selectively etching the buffer $SiO_2$ layer to silicon (and exposing lower surface 27 in FIG. 12), so as to expose and open the nanopores at the bottom of the pyramidal etch pits. In FIGS. 12 and 13, an open volume 28 is shown formed leading into the array 30 of nanopores 29 thus opened and formed. And FIG. 13 is an underside perspective view of the nanoporous membrane filter of the present invention after the nanopores are exposed and opened following FIG. 12. The nanopores thus formed are supported in a thick, mechanically robust silicon frame, allowing for direct integration of the filter with macroscopic microfluidic components. Using standard expressions for stress developed in supported diaphragms it has been calculated that a load of 40 kPa can be readily sustained by a membrane which is 250 nm thick, 20 μm in diameter.

Figure 14:
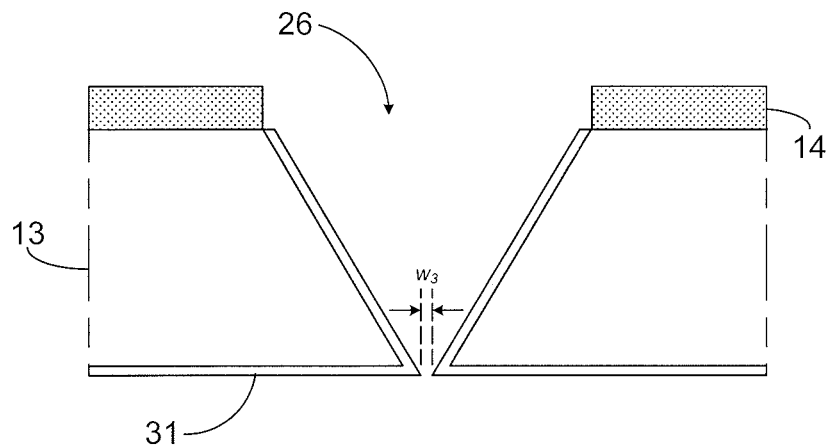
FIG. 14 is a schematic side view of a thermal oxidation step in an exemplary embodiment of the fabrication method, for decreasing pore size and/or providing voltage control.

After formation of the general nanoporous membrane filter is complete, the pore sizes may optionally be further "tuned" with angstrom-level precision, as shown in FIG. 14, via thermal oxidation of silicon to produce a $SiO_2$ layer, indicated at 31. This reduces the pore size to improve size resolution, which is shown as $w_3$ in FIG. 14. Pore size reduction tuning may also be followed by partial removal of the $SiO_2$ layer (using HF) to again increase pore size. Removing the resulting $SiO_2$ with HF acid will increase the pore size, while leaving $SiO_2$ in place will decrease the pore size, since the thickness of the consumed silicon is 44% of the thickness of the oxide formed. This approach is effective since the oxidation rate of silicon slow and well-understood. For example, it has been known that for (111) oriented silicon at 700° C., oxide forms at a rate of less than 1 nm/hour.

Figure 15:
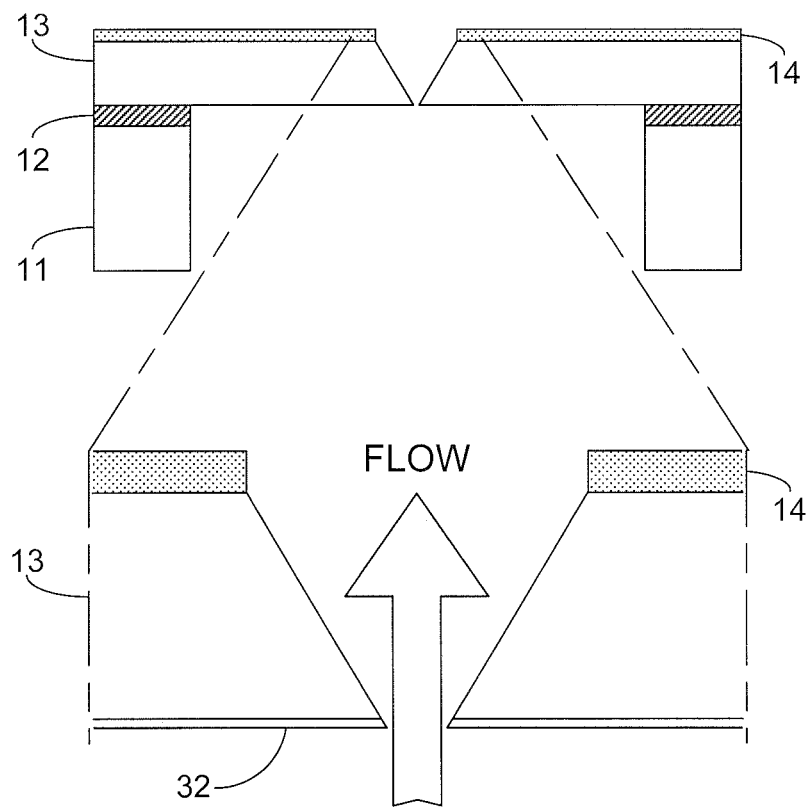
FIG. 15 is a schematic side view of flow through an exemplary embodiment of the nanoporous membrane filter of the present invention having a metal deposited on the lower surface of the top silicon layer.

FIG. 15 also illustrates an example flow direction of the completed membrane filter. Note that the flow direction during filter operation sends unfiltered fluid to the planar exterior surface of the pore, minimizing fouling. The tapered geometry of the pore facilitates high flow rates since the constriction volume is localized at this planar surface, as opposed to being extended through the thickness of the membrane as would be true for a cylindrical pore. This approach can achieve similar pore densities as track-etched pores in polycarbonate membranes, and if flow rate scales with pore aspect ratio, up to ~100× improvements can be realized. The tapered cavity geometry of the present invention is preferred to maximize the dynamic range of achievable flow rates, and especially to allow for effective separation at high flow rates needed for massively parallel bio-molecule purification and detection schemes.

In addition, FIG. 15 also illustrates the optional step of depositing a metal layer 32 on the lower surface of the top silicon layer 13 for voltage control. Voltage controlled pores allow for greatly enhanced selectivity. The nanopores of the present invention are uniquely suited for use in a powerful method for voltage control of bio-molecule flow rates that can improve purification efficiency by more than a hundred-fold. For filtration and sensing of bio-molecules, high levels of selectivity can be achieved at the pore opening by electrically biasing the surface of the pore while matching the pH of the working solution to the isoelectric point of the target molecule. At pH values above and below the isoelectric point, proteins experience Coulombic interactions with a charged pore surface, whereas for pH values equal to pI these forces disappear and transport is greatly enhanced. Voltage control can be achieved by growing a thin thermal oxide on the Si, then depositing a metal gate layer such as Au. Alternately, the silicon can be doped to allow direct voltage control of the surface, which could be especially advantageous for small ~1-10 nm pores where the roughness of a deposited metal layer would introduce variability in the effective field at the opening of the pore. In the tapered pore geometry of the present invention, voltage control is confined to the narrowest part of the pore. This architecture allows for precise mass transfer control at the apex while the broadening of the pore beyond the apex gives minimal mass transfer resistance.

Chemical functionality may also be designed into the nanopores of the present invention. In particular, additional chemical functionality can be imparted to an Au surface through thiol-functionalized molecules, or to silicon through direct silicon-carbon bond formation (or silane reactions with $SiO_2$) and other related methods. Coupled with the high-throughput tapered geometry of the voltage-controlled nanopore, these coatings can improve selectivity, further reducing and even eliminating issues associated with fouling.

Figure 16:
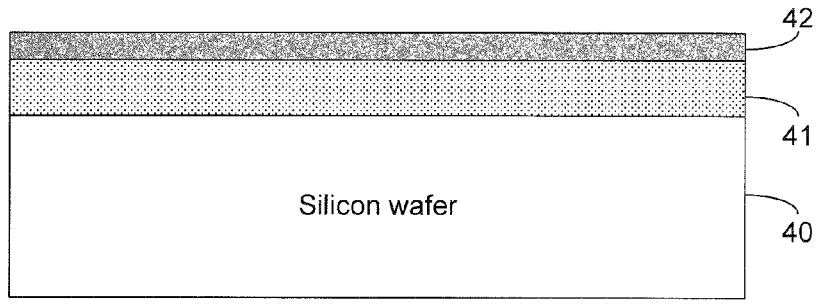
FIG. 16 is a schematic side view of a thin-film multilayer having a silicon nitride layer formed on (or a silicon dioxide layer is formed on) a silicon substrate, followed by the deposition of photoresist, in a second exemplary embodiment of the method of fabricating a nanoporous membrane filter of the present invention.
Figure 17:
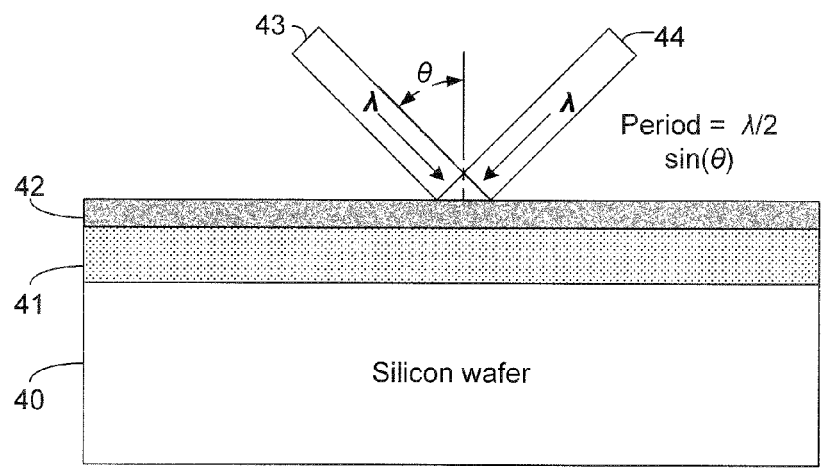
FIG. 17 is a schematic side view of the thin-film multilayer of FIG. 16 being exposed to interferometrically-arranged lasers to define an etch pattern on the photoresist.
Figure 18:
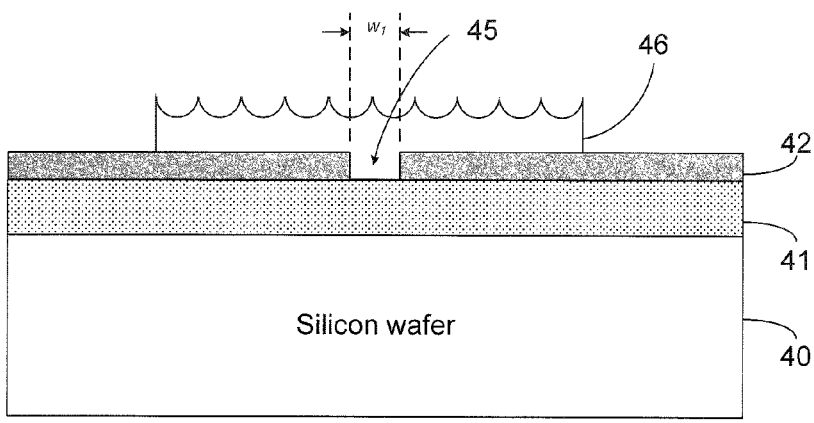
FIG. 18 is a schematic side view of the thin-film multilayer with the etch pattern produced from FIG. 17 and further illustrating an isotropic etching step using a wet chemical etchant such as for example hydrofluoric acid (HF) that isotropically etches silicon dioxide. For clarity, a single representative unit pattern is shown.
Figure 19:
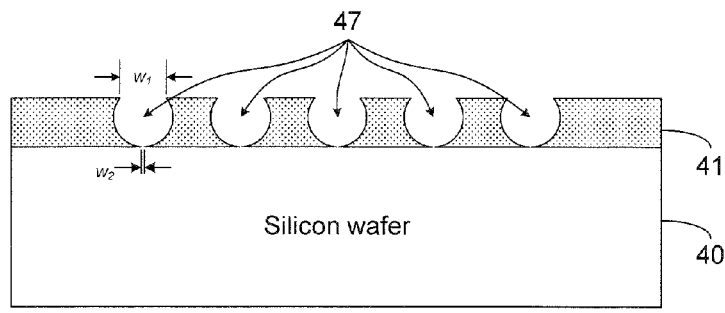
FIG. 19 is a schematic side view of the formation of an array of rounded (spherical) cavities produced by the isotropic wet etching step of FIG. 18.
Figure 20:
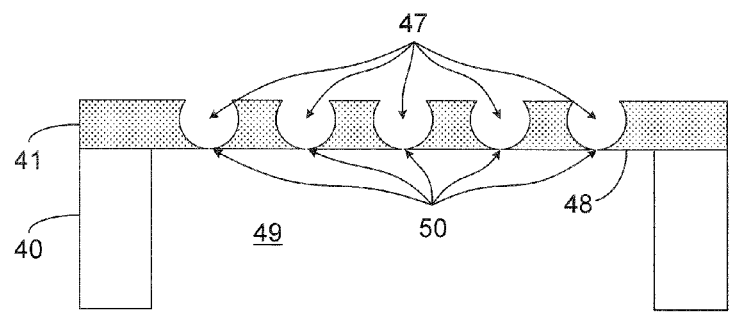
FIG. 20 is a schematic side view of the nanoporous membrane filter following FIG. 19 and showing the nanopores created at the bottom of the rounded (spherical) cavities after removing a portion of the silicon handle wafer by selectively etching silicon to $Si_3N_4$ or $SiO_2$.
Figure 21:
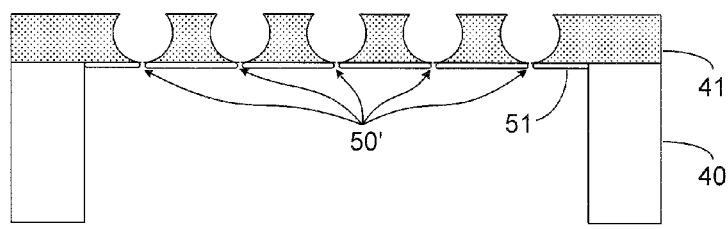
FIG. 21 is a schematic side view of a metal deposition step following FIG. 20 to further control pore size and/or provide voltage control.

FIGS. 16-21 show a second exemplary embodiment of a method of fabricating a nanoporous membrane filter of the present invention, where the membrane is a silicon nitride or silicon dioxide material. In particular, FIG. 16 is a schematic side view of a thin-film multilayer having a silicon nitride layer 41 formed on (or a silicon dioxide layer is formed on) a silicon substrate 40, followed by the deposition of photoresist 42. Next, in FIG. 17 the photoresist 42 is exposed to at least two interferometrically-arranged lasers (e.g. 43, 44) to define an etch pattern on the photoresist, shown by single representative unit pattern 45 in FIG. 18. In FIG. 18, an isotropic etching step using a wet chemical etchant 46 such as for example hydrofluoric acid (HF) is used to isotropically etch the silicon dioxide layer 41. In this second embodiment, the silicon dioxide layer (or silicon nitride layer) is used as the suitably rigid membrane structure of the nanoporous filter. This is shown in FIG. 19 showing the isotropic formation of an array of rounded (spherical) cavities 47 in the silicon nitride layer 41 produced by the isotropic wet etching step of FIG. 18. The etch cavity produced in this manner is a frusto-spherical cavity since both the top and bottom planes are flat. In particular, the frustum floor of the frusto-spherical cavity is shown having a size $w_2$, which is the desired pore size of the filter. In this case, the dimensions of the frustum floors, and thus the pore sizes, can be tuned by controlling etch time. Similar to the first embodiment, the nanopores are created by removing a portion of the silicon substrate 40, so as to remove the frustum floor. This is shown in FIG. 20 after removing a portion of the silicon handle wafer by selectively etching silicon over $Si_3N_4$ or $SiO_2$. An open volume 49 is created bounded in part by a lower surface 48 of the membrane structure, and leading to the nanopores 50. And FIG. 21 shows a schematic side view of an optional metal deposition step, indicated at 51, to further control pore size and/or provide voltage control. The tuned pores are indicated at 50'.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method of fabricating a nanoporous membrane filter having an array of uniform nanopores of a desired pore size, comprising:
    providing a thin-film multilayer having a (100)-oriented single crystal silicon layer adjacent a substrate layer, said single crystal silicon layer of a predetermined thickness which etches anisotropically with an anisotropic wet chemical etchant selective to silicon over a material of the substrate layer;
    forming a hard mask layer over the single crystal silicon layer;
    depositing photoresist over the hard mask layer;
    using at least two interferometrically-arranged lasers of the same wavelength to interferometrically define in the photoresist an etch pattern comprising an array of unit patterns each having a predetermined width that is substantially a function of the desired pore size and the predetermined thickness of the single crystal silicon layer;
    transferring the etch pattern from the photoresist to the hard mask layer to expose select portions of an upper boundary surface of the single crystal silicon layer;
    anisotropically etching the exposed select portions of the upper boundary surface of the single crystal silicon layer with the anisotropic wet chemical etchant until a lower boundary plane of the single crystal silicon layer is reached so that an array of inverted frusto-pyramidal etch cavities are formed each having a frustum floor at the lower boundary plane that is substantially equal in width to the desired pore size; and
    etching a section of the substrate layer with an etchant that is selective to the substrate material over silicon to remove the frustum floor of the etch pits at the lower boundary of the single crystal silicon layer and thereby form the array of uniform nanopores of substantially the desired pore size.

2. The method of claim 1,
    wherein the substrate includes a silicon wafer and a buffer layer separating the single crystal silicon layer from the silicon wafer.

3. The method of claim 2,
    wherein the thin film multilayer is a silicon-on-insulator (SOI) wafer comprising the silicon wafer, the single crystal silicon layer, and an insulating buffer layer.

4. A method of fabricating a nanoporous membrane filter having an array of uniform nanopores of a desired pore size, comprising:
    providing a thin-film multilayer having a substrate and a thin film layer of predetermined thickness which etches isotropically when etched with an isotropic wet chemical etchant that is selective to the thin film layer;
    depositing photoresist over the thin film layer;
    using at least two interferometrically-arranged lasers of the same wavelength to interferometrically define in the photoresist an etch pattern comprising an array of unit patterns each having a predetermined width that is substantially a function of the desired pore size and the predetermined thickness of the thin film layer, wherein the etch pattern exposes select portions of the thin film layer;

etching the exposed select portions of the thin film layer with the isotropic wet chemical etchant including controlling etch time so that an array of frusto-spherical etch pits are formed each having a frustum floor at a lower boundary of the thin film layer that is substantially equal in diameter to the desired pore size; and etching a section of the substrate with an etchant selective to the substrate to remove the circular frustum floor of the etch pits at the lower boundary of the thin film layer and thereby form the array of uniform nanopores having the desired pore size.

5. The method of claim 4,
wherein the thin film layer is selected from a group consisting of $SiO_2$ and $Si_3N_4$.

6. A method of fabricating a nanoporous membrane filter having an array of uniform nanopores of a desired pore size, comprising:

depositing photoresist on an uppermost layer of a thin-film multilayer comprising a substrate and a thin film layer over the substrate, said thin film layer having a predetermined thickness and which etches with a wet chemical etchant that is selective to the thin film layer;

using interferometric laser exposure of two same-wavelength beams of electromagnetic radiation to interferometrically define on the photoresist an etch pattern comprising an array of unit etch patterns;

etching the thin film layer with the wet chemical etchant so that an array of frusto-geometric etch pits are formed each having a frustum floor at a lower boundary of the thin film layer that is substantially equal in size to the desired pore size; and etching a section of the substrate with an etchant selective to the substrate to remove the frustum floor of the etch pits at the lower boundary of the thin film layer and thereby form the array of uniform nanopores having the desired pore size.

* * * * *